United States Patent
Chu

(10) Patent No.: US 7,368,519 B2
(45) Date of Patent: May 6, 2008

(54) FAST MOISTURE CURING AND UV-MOISTURE DUAL CURING COMPOSITIONS

(75) Inventor: Hsien-Kun Chu, Westerfield, CT (US)

(73) Assignee: Henkel Corporation, Rocky Hill, CT (US)

( * ) Notice: Subject to any disclaimer, the term of this patent is extended or adjusted under 35 U.S.C. 154(b) by 252 days.

(21) Appl. No.: 10/524,542

(22) PCT Filed: Oct. 15, 2003

(86) PCT No.: PCT/US03/32537

§ 371 (c)(1),
(2), (4) Date: Feb. 14, 2005

(87) PCT Pub. No.: WO2004/037868

PCT Pub. Date: May 6, 2004

(65) Prior Publication Data

US 2005/0267276 A1 Dec. 1, 2005

Related U.S. Application Data

(60) Provisional application No. 60/470,705, filed on Oct. 23, 2002.

(51) Int. Cl.
*C08G 77/20* (2006.01)
*C08L 83/04* (2006.01)

(52) U.S. Cl. .................... 528/34; 522/33; 522/38; 522/39; 528/17; 528/21; 525/477

(58) Field of Classification Search .................. None
See application file for complete search history.

(56) References Cited

U.S. PATENT DOCUMENTS

| 4,528,081 A | 7/1985 | Lien et al. ............... 522/39 |
| 4,675,346 A | 6/1987 | Lin et al. ................ 522/39 |
| 4,699,802 A | 10/1987 | Nakos et al. ............ 427/515 |
| 5,340,847 A | 8/1994 | Hanazuka et al. ......... 522/11 |
| 5,371,116 A * | 12/1994 | Sakamoto et al. ......... 522/33 |
| 5,384,340 A | 1/1995 | Hara et al. .............. 522/99 |
| 5,405,888 A | 4/1995 | Takeoka ................. 522/34 |
| 5,409,963 A | 4/1995 | Takfoka ................. 522/31 |
| 5,489,622 A | 2/1996 | Hara et al. .............. 522/99 |
| 6,018,011 A * | 1/2000 | Scheim et al. ............ 528/34 |

OTHER PUBLICATIONS

Chu, H.K., *Silicones and Silicone-Modified Materials*, ed. Clarson, et al., American Chemical Society, Washington DC, pp. 170-179 (2000).

* cited by examiner

*Primary Examiner*—Marc S. Zimmer
(74) *Attorney, Agent, or Firm*—Steven C. Bauman

(57) ABSTRACT

The invention provides fast moisture and photo/moisture curing silicone compositions and methods for the preparation thereof. More particularly, the compositions provided are prepared from silanol and silane cappers; the cappers have an $\alpha$-carbon bonded to the silicon atom allowing for a favorable hypervalent silicon transition state when reacting the silane and silanol. This favorable transition state enables both a fast endcapping reaction and contributes to the fast moisture curing properties of the inventive compositions.

13 Claims, No Drawings

FAST MOISTURE CURING AND UV-MOISTURE DUAL CURING COMPOSITIONS

CROSS REFERENCE TO RELATED APPLICATIONS

This application is the U.S. National Phase of International Patent Appl.Ser. No. PCT/US2003/32537 filed Oct. 15, 2003, which claims the benefit of an earlier filing date under 35 U.S.C. § 120 to U.S. Provisional Appl. No. 60/470,705 filed Oct. 23, 2002.

FIELD OF THE INVENTION

The invention provides fast moisture and photo/moisture curing silicone compositions and methods for the preparation thereof. More particularly, the compositions provided are prepared from silanol and silane cappers; the cappers have an α-carbon bonded to the silicon atom allowing for a favorable hypervalent silicon transition state when reacting the silane and silanol. This favorable transition state enables both a fast endcapping reaction and contributes to the fast moisture curing properties of the inventive compositions.

BRIEF DESCRIPTION OF RELATED TECHNOLOGY

The quest for fast curing silicone compositions that are both simple and economical to prepare as well as useful in a variety of industrial applications has lead to many developments for such compositions in recent years (e.g. U.S. Pat. Nos. 4,528,081; 4,699,802; 4,675,346 assigned to Henkel Loctite Corporation and U.S. Pat. Nos. 5,405,888; 5,409,963; 5,489,622; 5,384,340, 5,340,847 assigned to Three Bond Co. Ltd.). Notably, Chu (Chu, H. K., in *Silicones and Silicone-Modified Materials,* ed. Clarson, et al., American Chemical Society, Washington D.C., 2000, pp 170-179) has reported that silanol terminated polydimethylsiloxane (PDMS) can be readily endcapped with acryloxymethyldimethylacryloxysilane by simply mixing this silane with silanol terminated PDMS. The reaction is generally complete within seconds after mixing as evidenced by the transformation of the clear silanol fluid into a cloudy mixture due to the low solubility of the liberated acrylic acid in silicone. Removal of acrylic acid by vacuum stripping, if needed, yields the clear acrylate endcapped polydimethylsiloxane. Addition of a photoinitiator, fillers and other types of additives common to RTV silicones results in photo (i.e. ultraviolet or "UV") curable silicones.

The ease of this reaction was reported by Chu as being unexpected. In condensation reactions of acetoxysilanes with silanol, the reactivity of these silanes has been reported to be directly proportional to the number of acetoxy groups attached to silicon, presumably due to the electron withdrawing capability of the acetoxy groups that renders the silanes with more acetoxy groups more anenable to nucleophilic substitution. Thus, condensation with silanol takes place instantaneously with tetra-or triacetoxysilanes, but is orders of magnitude slower for diacetoxy-or monacetoxysilanes. Thus, acryloxymethyldimethylacryloxysilane, with only one acryloxy group directly attached to silicon, was reportedly expected to likewise react with silanol very slowly.

A reported explanation for the ease of this endcapping reaction was attributed to a hypervalent transition state (see Chu, above). Several similar silanes with a carbonyl group γ- to silicon have been shown to possess pentacoordinate silicon structures with an intramolecular coordinate Si←O=C bond. High reactivities of many such hypervalent silicon compounds have been observed and are attributed to the hypervalency of these silanes (see Chu, above). Although acryloxymethyldimethylacryloxysilane has been reported to be tetracoordinate, rather than exhibiting pentacoordinate hypervalency, the high reactivity between this silane and silanol has been attributed to the anchimeric assistance of the acryloxymethyl group on the leaving acryloxy group during endcapping of the silanol. A hexacoordinate hypervalent transition state (resulting from the intramolecular coordinate from both the Si←O=C bond and the O bond from the silanol) has been proposed to be responsible for the ease of the reaction (see Chu, page 178) and the proposed structure below:

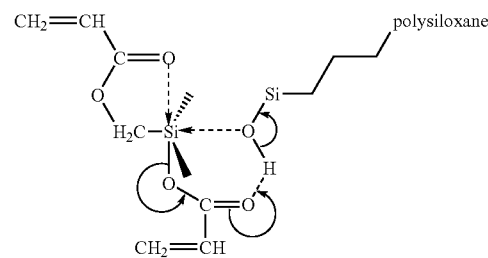

Although as described above, photocurable silicon compositions have been developed using cappers such as acryloxymethyldimethylacryloxysilane that allow for a favorable silicon transition state resulting in fast endcapping reactions, compositions derived from such cappers that will result in moisture or dual (UV/moisture) curing silicone compositions are needed.

Furthermore, there is a need for faster curing moisture curable compositions. As is well known in the art, many moisture-curing silicone systems provide good physical properties and performance when fully cured, but they suffer from the disadvantage of slow cure. Bauer et al ("NCO-Silane Terminated Copolymers with Tunable Curing Rates", Munich, 2001, $1^{st}$ European Silicon Days) have reported, however, that polymers derived from isocyanatomethylalkoxysilanes (i.e. those silanes having an α-carbon bonded to the silicon atom) and aminoalkyl/silicones result in an extremely enhanced curing rate, putatively due to the hypervalent transition state that occurs during curing (i.e. crosslinking of reactive silicones) when exposed to ambient conditions. However the isocyanatosilanes used to create these polymers may be of concern due to the undesirable toxicological effects of isocyanates in general.

Hence, there is a need in the art for photo/moisture curable and moisture curable compositions having fast moisture curing properties that can be prepared by simple, safe and economical methods and also allow for fast endcapping reactions

SUMMARY OF THE INVENTION

The invention provides compositions capable of fast moisture cure. The compositions, which include both hydrolyzable functional silanes and silanols may be exclusively moisture curing or dual (photo/moisture) curing. The silanes contain a single carbon linkage between the silicon atom and, for example, an acetyl or methacryloyl group (see structure I below). This linkage provides for the formation of a favorable hypervalent silicon transition state, allowing fast nucleophilic substitution on silicon during endcapping and curing reactions.

More particularly, the invention provides a composition including:

a) a compound having the structural formula:

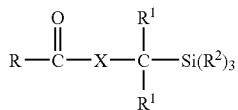

(I)

wherein R is a $C_{1-20}$ alkyl which may be substituted or unsubstituted or an unsaturated free radical-curing group;

$R^1$ is hydrogen or a $C_{1-6}$ hydrocarbon radical; $R^2$ is a hydrolyzable group; X is oxygen or

$R^3$ is H or $C_{1-12}$ hydrocarbyl group; and b) a polymer having the structure formula:

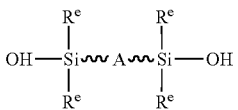

(II)

wherein A is a backbone selected from the group consisting of organic and siloxane backbones, and $R^e$ is $CH_3$ or H.

Further provided is a curable composition having the reaction product of a) a compound having the structural formula:

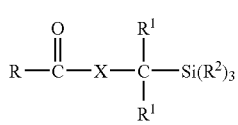

(I)

wherein R is a $C_{1-20}$ alkyl which may be substituted or unsubstituted or an unsaturated free radical-curing group;

$R^1$ is hydrogen or a $C_{1-6}$ hydrocarbon radical; $R^2$ is a hydrolyzable group; X is oxygen or

$R^3$ is H or $C_{1-12}$ hydrocarbyl group; and b) a polymer having the structure formula:

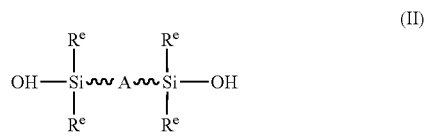

(II)

wherein A is a backbone selected from the group consisting of organic and siloxane backbones, and $R^e$ is $CH_3$ or H.

Furthermore, in another aspect of the invention there is provided a method of preparing a curable composition including the step of combining:

a) a compound having the structural formula:

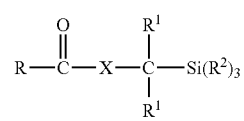

(I)

wherein R is a $C_{1-20}$ alkyl which may be substituted or unsubstituted or an unsaturated free radical-curing group;

$R^1$ is hydrogen or a $C_{1-6}$ hydrocarbon radical; $R^2$ is a hydrolyzable group; X is oxygen,

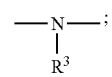

$R^3$ is H or $C_{1-12}$ hydrocarbyl group; and b) a polymer having the structure formula:

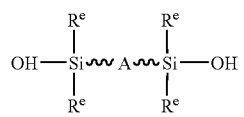

(II)

wherein A is a backbone selected from the group consisting of organic and siloxane backbones, and $R^e$ is $CH_3$ or H.

DETAILED DESCRIPTION OF THE INVENTION

In one aspect of the invention, a curable composition is provided having a silane capper compound of the formula:

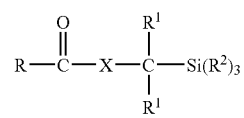

(I)

wherein R is a $C_{1-20}$ alkyl which may be substituted or unsubstituted or an unsaturated free radical-curing group;

$R^1$ is hydrogen or a $C_{1-6}$ hydrocarbon radical; $R^2$ is a hydrolyzable group; X is oxygen or

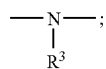

$R^3$ is H or $C_{1-12}$ hydrocarbyl group; and
a silanol-terminated polymer having the structure:

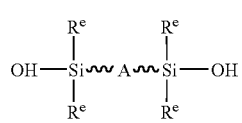

wherein A is a backbone selected from the group consisting of organic and siloxane backbones, and $R^e$ is $CH_3$ or H.

In a desired embodiment, $R^2$ is selected from the group consisting of

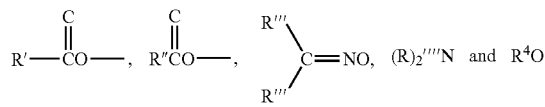

wherein R', R", R'" and R"" is H or a monovalent substituted or unsubstituted $C_{1-6}$ hydrocarbon radical, and $R^4$ is a $C_{1-2}$ alkyl group.

In a particularly desired embodiment, $R^2$ is selected from the group consisting of

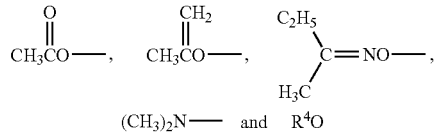

wherein $R^4$ is a $C_{1-2}$ alkyl group.

In a particularly desired embodiment, $R^2$ is an alkoxy group having the formula

wherein $R^4$ is a $C_{1-2}$alkyl group.

In another desired embodiment, R is a $C_{1-20}$ alkyl or $C_{2-20}$ alkenyl either of which may be substituted or unsubstituted.

Desirably, both moisture and photo curable groups are present on the silane capper of the invention. In this embodiment, the composition includes a silane capper wherein R includes an unsaturated free radical-curing group (i.e. a $C_{2-20}$ alkenyl which may be substituted or unsubstituted), capable of undergoing free radical cure, such as UV cure, and $R^1$, $R^2$, X, and $R^3$ are as described above and structural formula II is as described above.

In another desired aspect of the invention, a moisture curable composition is provided wherein the silane capper exclusively includes moisture curable groups. In this embodiment, the composition includes structural formula I wherein R is a $C_{1-20}$ alkyl which may be substituted or unsubstituted, $R^1$, $R^2$, X, and $R^3$ are as described above, and structural formula II is as described above.

Regardless of whether the final composition is curable by UV, moisture or both, the most desirable silane capper has the general formula III

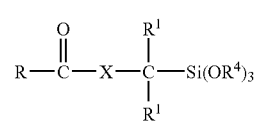

wherein R, $R^1$, $R^2$ and $R^4$ are as described above.

Among capper compounds of the general formula III set out broadly hereinabove, a preferred class of such compounds includes those in which the alkoxyfunctional silane contains a carboxyl group. Therefore, X is desirably O. Thus a preferred class of compounds are of the formula:

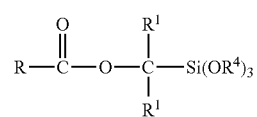

wherein R, $R^1$ and $R^4$ are as defined above.

In a particularly desired preferred embodiment, a photo/moisture curable composition is provided which includes a polymer according to structural formula II and an alkoxysilane according to structural formula IV wherein R is

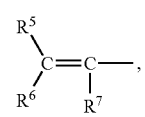

and $R^5$, $R^6$ and $R^7$ are independently selected from hydrogen, halogen and organo radicals, and $R^1$ and $R^4$ are as described above.

In a particularly desired embodiment, the structure of the silane capper used in the photo/moisture curing composition is an alkoxysilane of formula IV wherein R is structural formula V and $R^5$ and $R^6$ are H and $R^7$ is $CH_3$. Hence, a particularly desired embodiment of the silane capper is that of structural formula VI below:

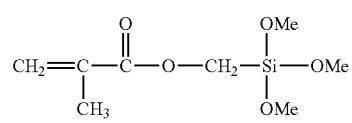

In yet, another desirable embodiment, the structure of the capper used in the curing composition of the invention is an alkoxysilane of structural formula IV wherein R is a methyl group and $R^1$ and $R^4$ are as described above. Thus, in this embodiment the desired structure is of structural formula VII below.

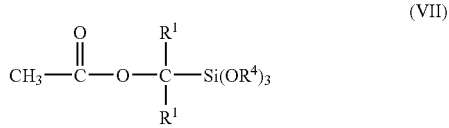

(VII)

The synthesis of the silane cappers described above may be prepared by any desirable method known in the art. For example, the synthesis of an acryloxy-functional alkoxysilane such as that of structural formulas VI may prepared by using the following reaction step:

(a) reacting (i) a (meth)acrylic acid compound of the formula:

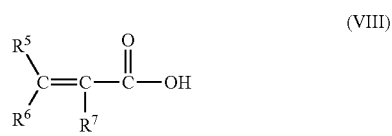

(VIII)

wherein $R^5$, $R^6$ and $R^7$ are independently selected from hydrogen, halo and organo radicals, with (ii) a chlorosilane compound of the formula:

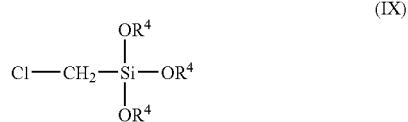

(IX)

wherein $R^4$ is as described above.

In another embodiment, the proton in structural formula VII may be replaced with $Na^+$ or $K^+$ and reacted with structural formula IX.

In carrying out the reaction of the (meth)acrylic acid compounds with the chlorosilane compounds, it is generally advantageous to use a base such as triethylamine under refluxing xylene or dimethylformamide to function as a hydrogen chloride acceptor, thereby removing the hydrogen chloride formed in the reaction. In some instances, it may be feasible to remove the hydrogen chloride by-product by sparging the reaction mixture with nitrogen, whereby the passage of nitrogen throughout the mixture removes the hydrogen chloride. Additionally, acrylate polymerization inhibitor such as hydroquinone (HQ) may also optionally be added to the mixture.

In an alternative embodiment, where X in structural formula I is

wherein $R^3$ is H or a $C_{1-12}$ hydrocarbon radical, structural formula I may be formed by reacting amino methyltrialkoxysilane with methacryl chloride.

The reaction may be carried out at any suitable temperature; generally, temperatures on the order of from about 25° C. to about 150° C. are usefully employed and preferably from about 100° C. to 140°, most preferably at about 120° C. The time required to carry out the reaction may be readily determined for a given reaction system by simple analytical tests without undue experimentation, and the reaction time may be varied as necessary or desirable in a given application. By way of example, the reaction may be carried out in approximately 2-3 hours. After the reaction has been carried out, the reaction mixture may optionally be subjected to vacuum stripping or other suitable treatment for the removal of residual acrylic acid from the reaction mixture to the extent desired.

Similarly, an alkoxysilane capper of the invention containing an acetoxy functional group may be prepared by reacting acetic acid with structure IX to yield a reaction product such as that of structure VII where $R^1$ is H.

The silanol-terminated polymer of structural formula II can be virtually any useful silanol-terminated material. The silanol-terminated polymer as described above has the general formula

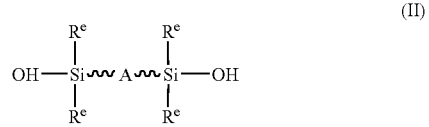

(II)

wherein A represents a polymer or copolymer backbone. The backbone can be any number of combinations of polyurethane, silicone, polyamide, polyether and the like. Desirably, A is an organic or a siloxane backbone. More desirably, A is a siloxane.

An example of one such silanol-terminated polymer is polydimethylsiloxane having the formula:

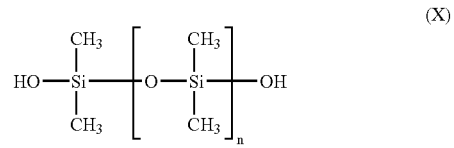

(X)

The number of repeating units will determine the molecular weight and hence the viscosity of this starting material. Thus, n can be, for example, an integer which, for example, can be from about 1 to about 1,200, desirably from about 10 to about 1,000. The viscosity of these materials is not critical and can easily be chosen to fit a particular product application, particularly because the hydrolyzable terminated end product of this reaction will have substantially the same viscosity as the silanol-terminated reactant. Viscosities of these silanol-terminated polymer backbone can range from about 1 cps to about 150,000 cps (Brookfield, 25° C.). Desirably, the silanol-terminated polymer backbone used in the present invention is from about 50 to about 150,000 cps. Useful silanol terminated polymers include those from about 50 cps silanol-terminated polydimethylsiloxane, to about 150,000 cps silanol-terminated polydimethylsiloxane and combinations thereof.

The invention also provides a curable composition including the reaction product of a silane capper as described above with the polymer of structural formula II also as described above. The reaction of structure I and II, due to the carbon diradical linkage between the silicon in the capper and the —X—CO—R group enables a favorable hypervalent silicon transition state during the capping reaction resulting in fast nucleophilic substitution on silicon.

Desirably, this reaction product cures in less than about 20 minutes. More desirably the reaction product cures in less than about 15 minutes. Even more desirably, the reaction product cures between about 3 minutes and about 14 minutes. Yet, even more desirably, the reaction product cures in about 5 minutes.

The determination that the reaction product is cured is measured by examining the skin over time. As used herein, "skin over time" refers to the time it takes for a spatula to no longer pick up liquid upon contact with a reaction product.

The reaction of structure I and structure II of the present invention is desirably performed in the presence of a catalyst. Desirable catalysts include organo-lithium reagents, which are represented by the formula $LiR^{12}$ wherein the organo group $R^{12}$ is selected from the group consisting of $C_{1-18}$ alkyl, $C_{1-18}$ aryl, $C_{1-18}$ alkylaryl, $C_{1-18}$ arylalkyl, $C_{2-18}$ alkenyl, $C_{2-18}$ alkynyl, amine-containing compounds, as well as organosilicon-containing compounds. $R^{12}$ can have from 1 to 18 carbon atoms in the chain ($C_{1-18}$). These reagents provide enhanced processing and improved quality of product made therefrom The organo-lithium catalyst is preferably an alkyl lithium such as methyl, n-butyl, sec-butyl, t-butyl, n-hexyl, 2-ethylhexyl butyl and n-octyl butyl lithium. A particularly desirable catalyst is N-butyllithium in hexane (such as at 1.6 Molar concentration). Other useful catalysts include phenyl lithium, vinyl lithium, lithium phenylacetylide, lithium (trimethylsilyl) acetylide, lithium silanolates and lithium siloxanolates. The organo group can also be an amine-containing compound, such as dimethylamide, diethylamide, diisopropylamide or dicyclohexylamide, or a silicon-containing compound. (See, for example U.S. Pat. No. 5,300,608 (Chu); U.S. Pat. No. 5,663,269 (Chu) and U.S. Pat. No. 6,140,444 (Chu)).

The organo-lithium reagents are used in catalytically effective amounts. Generally, the catalytically effective amount of an organo-lithium catalyst will vary with the specific catalyst and reactant materials, but about 1 to 1000 ppm based on the atomic weight of lithium are useful. A more preferred range is 5-250 ppm. Removal of the residual organo-lithium catalyst can be optionally accomplished through filtration.

Other catalysts useful in, but less desirable, in preparing the reactive silicones include organometallic catalysts such as titanates and organo tin catalysts known in the art.

The reactive silicone compositions of the invention may further include a curing system. A curing system includes but is not limited to catalysts or other reagents which act to accelerate or otherwise promote the curing of the composition of the invention.

When moisture curing is desirable, the catalysts which may be included in the curing system of the invention include, but are not limited to, tin IV salts of carboxylic acids, such as dibutyltin dilaurate, organotitanium compounds such as tetrabutyl titanate, and partially chelated derivatives of these salts with chelating agents such as acetoacetic acid esters and beta-diketones and amines. Desirably, tetraisopropyltitanate, dibutyltin dilaurate and tetramethylguandine at levels of 0.05-0.5% are used.

Where photo curing is desirable, any known radical photoinitiators can be included in the compositions of the invention. Photoinitiators enhance the rapidity of the curing process when the photocurable compositions as a whole are exposed to electromagnetic radiation. Examples of suitable photoinitiators for use herein include, but are not limited to, photoinitiators available commercially from Ciba Specialty Chemicals, Tarrytown, N.Y. under the "IRGACURE" and "DAROCUR" tradenames, specifically "IRGACURE" 184 (1-hydroxycyclohexyl phenyl ketone), 907 (2-methyl-1-[4-(methylthio)phenyl]-2-morpholino propan-1-one), 369 (2-benzyl-2-N,N-dimethylamino-1-(4-morpholinophenyl)-1-butanone), 500 (the combination of 1-hydroxy cyclohexyl phenyl ketone and benzophenone), 651 (2,2-dimethoxy-2-phenyl acetophenone), 1700 (the combination of bis(2,6-dimethoxybenzoyl-2,4,4-trimethyl pentyl) phosphine oxide and 2-hydroxy-2-methyl-1-phenyl-propan-1-one), and 819 [bis(2,4,6-trimethyl benzoyl) phenyl phosphine oxide] and "DAROCUR" 1173 (2-hydroxy-2-methyl-1-phenyl-1-propane) and 4265 (the combination of 2,4,6-trimethylbenzoyl-diphenylphosphine oxide and 2-hydroxy-2-methyl-1-phenyl-propan-1-one); and the visible light [blue] photoinitiators, dl-camphorquinone and "IRGACURE" 784DC. Of course, combinations of these materials may also be employed herein.

Other photoinitiators useful herein include alkyl pyruvates, such as methyl, ethyl, propyl, and butyl pyruvates, and aryl pyruvates, such as phenyl, benzyl, and appropriately substituted derivatives thereof.

Photoinitiators particularly well-suited for use herein include ultraviolet photoinitiators, such as 2,2-dimethoxy-2-phenyl acetophenone (e.g., "IRGACURE" 651), and 2-hydroxy-2-methyl-1-phenyl-1-propane (e.g., "DAROCUR" 1173), diethoxyacetophenone, bis(2,4,6-trimethyl benzoyl) phenyl phosphine oxide (e.g., "IRGACURE" 819), and the ultraviolet/visible photoinitiator combination of bis(2,6-dimethoxybenzoyl-2,4,4-trimethylpentyl) phosphine oxide and 2-hydroxy-2-methyl-1-phenyl-propan-1-one (e.g., "IRGACURE" 1700), as well as the visible photoinitiator bis($\eta^5$-2,4-cyclopentadien-1-yl)-bis[2,6-difluoro-3-(1H-pyrrol-1-yl)phenyl]titanium (e.g., "IRGACURE" 784DC).

The amount of photoinitiator used in the composition will typically be in the range of between about 0.1% and 5% of the composition. Depending on the characteristics of the particular photoinitiator, however, amounts outside of this range may be employed without departing from the invention so long as they perform the function of rapidly and efficiently initiating polymerization. In particular, higher percentages may be required if silicone bound photoinitiators are used with high equivalent weight per photoinitiating group.

The inventive compositions may also contain other additives so long as they do not interfere with the curing mechanisms. The curable silicone compositions of the present invention can be mixed with or include other conventional additives such as viscosity modifiers such as trimethyl(silyl) terminated polydimethyl silicone, initiators, promoters, pigments, fillers, moisture scavengers and the like to form a one-part curable composition. Particularly useful fillers include fumed silica, silane treated, calcium carbonate, calcium carbonate (hydrophobic) and combinations thereof. Desirable pigments additives include carbon black. Moisture scavengers such as methyltrimethoxysilane and vinyltrimethyloxysilane are useful.

Other particularly useful additives include hexamethyldisilazane, vinyltrimethoxysilane, aminopropyltriethoxysilane and combinations thereof. Desirably, adhesion promoters include, but are not limited to, such as glycidoxypropyltrimethoxysilane, aminopropyltrimethoxysilane, methacryloxypropyltrimethoxy-silane, triallyl-S-tria-zine-2,3,6(1H.3H.5H)-trione aminoethylaminopropyltrimethoxysilane and others known to those skilled in the art. Fillers such as silica, microballoon glass and the like are useful for their conventional purposes.

The invention also provides a method of preparing a curable composition including the steps of reacting a silane capper according to structural formula I as described above with structural formula II. In this aspect of the invention, structural formula II may be devolitized under vacuum for an appropriate time period as is known in the art, generally 1-2 hours. The devolitization occurs at elevated temperatures, typically between 80° C. to 150° C., more desirably between 100° C. and 110° C. After cooling the silanol of structural formula II to between about room temperature to about 90° C., and more preferably from about room temperature to 75° C., the silane capper is added to the silanol.

Desirably, a catalyst is used to increase the rate of capping. Desired catalysts include the organic lithium catalysts described above. Desirably, N-butyllithium in hexane (1.6 M) is used. Endcapping under these conditions occurs immediately.

Although the silane capper of the invention and structural formula II may be utilized in any suitable proportions relative to one another consistent with the number of alcohol-reactive functional groups on structure II, it generally is preferred to utilize relative amounts of the inventive capper and structure II providing up to about 1.5 or more equivalents of silane for with the silane of structure II, and desirably the equivalents ratio of silane to alcohol-functionality is from about 1.0 to 1.2.

The method also provides a curing system as described above. Desired catalyst for use in moisture curing include but are not limited to tetraisopropyltitanate, dibutyltin dilaurate and tetramethylguandine as well as photoinitiators including those described herein above. Fillers or reinforcing materials, adhesion promoters, anti-oxidants, flame retardants and pigments, etc may also optionally be provided in the method of the invention.

EXAMPLES

Example 1

Preparation of methacryloxymethyltrimethoxysilane Inventive Capper (Structural Formula VI)

A 500 ml three neck round bottom flask equipped with a mechanical stirrer and condenser were charged with 21.6 g sodium methacrylate, 40 ml dimethylformamide (DMF) and 0.04 grams of acrylate polymerization inhibitor, hydroquinone (HQ) and 34.20 g of chloromethyltrimethoxysilane. The mixture was heated under a closed system to 120° C. for 2.5 hours. After cooling to room temperature, the mixture was vacuum filtered and the DMF distilled under vacuum at 40° C. -45° C. The crude reaction product was further vacuum fractionated to yield 24.54 g of the capper (56% yield). Capper VII was similarly prepared using sodium acetate and chloromethyltrimethoxysilane.

Example 2

Preparation of Inventive Polymer A and C

Inventive polymer A was prepared by charging 1000 g of a 750 cps of hydroxyl-terminated polydimethylsiloxane into a 2 liter three neck round bottom flask and devolitizing the fluid under vacuum at 105° C. for one hour. The silanol was cooled to 75° C. and 40.29 g of capper (structural formula VI) prepared according to Example 1 was added to the silanol along with 1 ml of N-butyllithium in hexane (1.6 Molar). Endcapping occurred immediately as evidenced by transformation of the clear silanol fluid into a cloudy mixture due to rapid boiling of the liberated methanol in silicone. The mixture was vacuum stripped with stirring at 75° C. 20 g of Polymer A was then used to assess skin over time. Polymer C was similarly prepared, but using capper VII instead.

Example 3

Comparison of Inventive Polymer A with a Comparative Polymer B

Comparative polymer B is of identical composition to inventive polymer A except that the comparative capped polymers contain a propyl rather a methyl linkage to the silicon. Methylacryloxypropyl dimethoxysiloxy-terminated PDMS was used as comparative polymer B. Polymer C was prepared similarly as in Example 2 using methacryloxy propyl trimethoxy silane instead of methacryloxy methyl trimethoxy silane. Comparison of skin over times for inventive polymer A and comparative polymer B after addition of catalyst (tetraisopropyltitanate, TIPT) are shown in Table 1. TIPT was prepared by mixing 0.1 g TIPT with 5 g of methyl-terminated poly(dimethylsiloxane) before its addition to the polymers.

TABLE 1

| | Skin over time (SOT) | |
|---|---|---|
| Polymer A | | Comparative Polymer B |
| 0.1% TIPT | 40 min. | >24 hours |
| 0.2% TIPT | 24 min. | overnight |
| 0.5% TIPT | 12 min. | 2.5-3 hours |

As is evident from Table 1, moisture curing using the reaction product of the composition of the invention results in a much faster cure in comparison to compositions prepared from a silane having a propenyl linkage rather than a methyl linkage linked to the silicon.

Example 4

Skin Over Time of Inventive Polymer A in the Presence of Catalyst and Photoinitiator 23 g of inventive composition A was added to $(MeN)_2C=NH$ in a closed vial. The skin over time was 3 minutes when 0.2% (tetramethylguanidine) TMG was added to the mixture. When 1% photoinitiator, diethylacetophenone (DEAP) was also added, the moisture cure slowed to about 10 to 15 minutes. The formulation cured to silicone rubber when irradiated with a medium pressure mercury lamp with an intensity of 70 mW/cm$^2$ for 30 seconds.

Example 5

Skin Over Time for Inventive Polymer C: Comparison of Catalysts and Photoinitiator The effect of different catalysts on skin over time of the inventive composition C was compared as shown in Table 2. Inventive composition C is an acetoxymethyltrimethoxysilane capped polydimethylsiloxane. The use of catalysts TIPT and TMG resulted in similar rates of skin over time. As shown in Table 2, the addition of photoinitiator, diethylacetophenone (DEAP) increased the rate of skin over time when used with the catalyst TIPT. The effect on skin over time is not effected when DEAP is used with TMG.

TABLE 2

| Composition C | |
|---|---|
| Curing agent | Skin over time |
| 0.1% TMG | 5 min. |
| 0.2% TMG | 2 min. |
| 0.1% TMG, 1% DEAP | 5 min. |
| 0.3% TIPT, 1% DEAP | >10 min. |

Examples 1-5 show that when the silane cappers used in the compositions have a methyl rather than a propyl linkage to the silane, faster curing in the presence of a moisture catalyst occurred, as measured by skin over time. Additionally, endcapping of the silanol occurred immediately upon addition of lithium catalyst.

The examples also reveal that particular catalysts, such as TIPT, will increase the curing time when used with the photoinitiator, DEAP. The catalyst, TMG, however, is not effected by DEAP and skin over time was 5 minutes.

What is claimed is:

1. A curable composition comprising:
a) a compound having the structural formula:

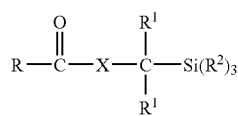
(I)

wherein R is a $C_{1-20}$ alkyl which is optionally substituted or an unsaturated free radical-curing group; $R^1$ is hydrogen or a $C_{1-6}$ hydrocarbon radical; $R^2$ is a hydrolyzable group; X is oxygen or

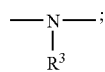

$R^3$ is H or $C_{1-12}$ hydrocarbyl group; and
b) a polymer having the structural formula:

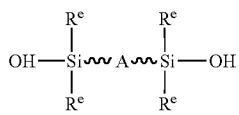
(II)

wherein A is a backbone selected from the group consisting of organic and siloxane backbones, and $R^e$ is $CH_3$ or H, wherein formula I and formula II are present in amounts such that the resulting ratio of said hydrolyzable groups of formula I to said OH groups of formula II is 1.2.

2. The composition according to claim 1, wherein said curable composition is a dual cure photo/moisture curable composition.

3. The method according to claim 2, wherein R is alkenyl, which may be substituted or unsubstituted.

4. The composition according to claim 1, wherein said curable composition is a moisture curable composition.

5. The method according to claim 4, wherein R is a $C_{1-20}$ alkyl which is optionally substituted.

6. The method according to claim 4, wherein R is a methyl group.

7. The composition according to claim 1, wherein X is O.

8. The composition according to claim 1, wherein $R^2$ is an alkoxy group having the formula $R^4O$- wherein $R^4$ is a $C_{1-2}$ alkyl group.

9. The composition according to claim 1 wherein R is

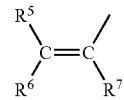

and $R^5$, $R^6$ and $R^7$ are independently selected from the group consisting of hydrogen, halogen and organo radicals.

10. The composition according to claim 1 wherein A is a polysiloxane.

11. A composition comprising
(a) a compound having the structural formula

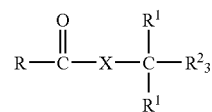
(I)

wherein R is $CH_3$, $R^1$ is hydrogen or a $C_{1-6}$ hydrocarbyl group, $R^2$ is $OR^4$, $R^4$ is a $C_{1-2}$ alkyl group, and X is O, and
(b) a polymer having the structural formula

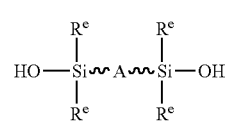
(II)

wherein A is a backbone selected from the group consisting of organic and siloxane backbones, and $R^e$ is $CH_3$ or H.

12. The curable composition of claim 11 or claim 1 wherein said reaction product has a skin over time when exposed to curingly effective conditions of 15 minutes or less.

13. The curable composition of claim 12 wherein said reaction product has a skin over time when exposed to curingly effective conditions of 5 minutes or less.

* * * * *